2,865,337

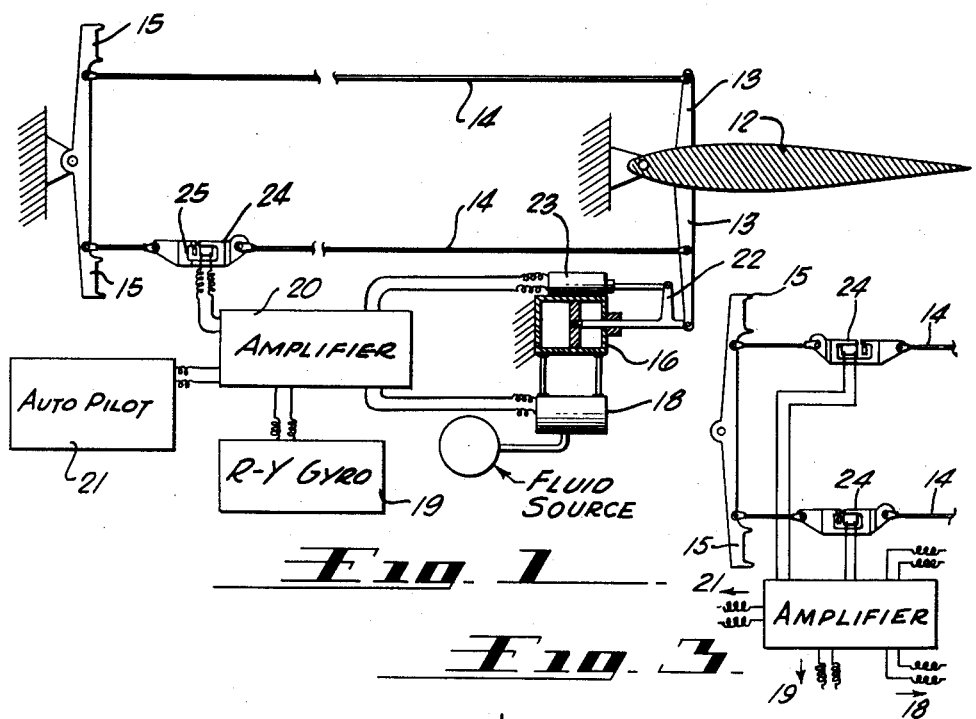
Fig. 1
Fig. 3
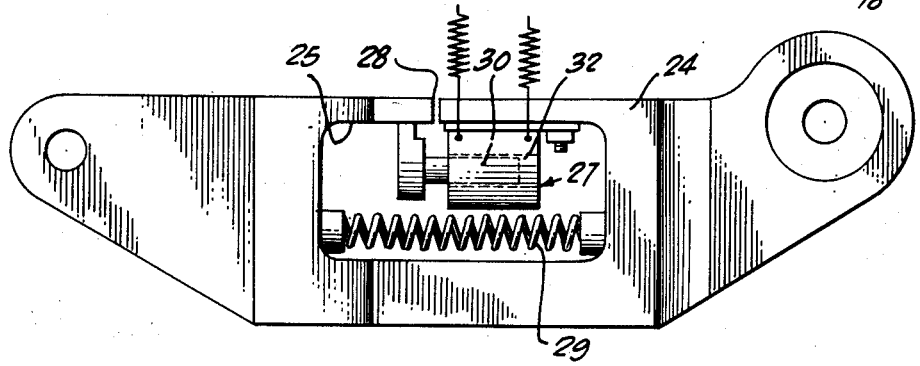
Fig. 2
INVENTORS
PAUL A DENNIS AND
DOUGLAS DILL
BY Edwin Coates
ATTORNEY United States Patent Office 2,865,337
Patented Dec. 23, 1958

YAW DAMPING SYSTEM

Paul A. Dennis, Hermosa Beach, and Douglas Dill, Los Angeles, Calif., assignors to Douglas Aircraft Company, Inc., Santa Monica, Calif.

Application September 2, 1955, Serial No. 532,136

8 Claims. (Cl. 121—41)

This invention has to do with yaw-damping systems for unitary rudders. It is particularly adapted to employment in pilot-powered rudders, or pedally operated rudders, but, as will be perceived, is equally well suited for use with rudders including autopilot control means.

Previously in such systems the pilot was required to physically overpower the yaw-damping system whenever he no longer required it or wished to steer, or when anything failed and became a drag on the rudder controls. Many of the previous yaw-damping systems were strictly limited to use only in conjunction with a substantially continuously operating autopilot and the yaw damping system could not function when the craft was under normal physical-power control by the pilot.

This invention provides a yaw-damping system which, among other things, will function both when the autopilot is operating and when physical power is being employed and in which a physical force of any desired value can be exerted to overpower the yaw-damper.

In a typical form of this invention, a signal generated by a rate-of-yaw gyro is fed to the conventional amplifier of a standard autopilot system, either to damp yaws when the autopilot is cut out of the rudder control system; or to impose the rate-of-yaw signal upon the autopilot system when the latter is operating so as to in either case damp yawing and control the rudder. Preferably, though not necessarily, the yaw-damping forces of the yaw-damper per se, are provided by a hydraulically actuated piston controlled by an electrically actuated valve in turn electrically connected to the amplifier of the autopilot. In the mechanical controls of the rudder, a "force-link" is so incorporated and organized that when the pilot is operating the rudder by means of the rudder-pedals and he desires to override the yaw damping system for pilot-steering, with the yaw-damper still able to counteract yawing, rather than his being required to physically overpower the usual resisting yaw-damper, in the present invention if he applies merely a force of sufficient magnitude opposing that exerted by the rate-of-yaw gyro, the yaw-damper will be dominated, thus throwing the control entirely onto the pilot himself, while remaining concurrently responsive to yawings.

In one form, the force-link itself comprises a link-body interposed in one of the physically operated rudder control-linkages, the body including a central aperture weakened on one side as by a sawcut and changing the position of a plunger, located in an inductance coil in the aperture and so connected to the aforementioned amplifier, as to override or superpose upon the signals fed to the amplifier from the autopilot or from the rate-of-yaw gyro, thereby to concurrently enable both the pilot and the gyros to operate so that the yaw-damping system is never disassociated from the rudder.

In order to render the inventive concepts more concrete, the presently-preferred embodiment of the invention is illustrated in the accompanying drawings and is described hereinafter in conjunction therewith. It is to be understood, however, that this illustration and description in no wise constitute the invention itself, the latter being as defined in the appended claims.

In these drawings,

Fig. 1 is a diagrammatic view of a rudder including a control system therefor that incorporates a yaw damping arrangement therein that is typical of the present invention;

Fig. 2 is a top plan view of a force link employed in the control system, and

Figure 3 is a fragmentary view, similar to that of Figure 1, of another species of the invention.

The present yaw-damping system is particularly suitable for use with control-systems that are dually powered, being operable both by an autopilot and directly by the pilot's physical efforts, but it is also suitable for use with rudder control systems that are operated solely by the pilot's efforts. It is here shown as comprising a vertically disposed unsplit, or unitary rudder 12, operable by means of horns 13, control linkage 14, such as push-pull rods, and a pair of rudder pedals 15, in the usual manner.

In this illustrative embodiment, the yaw-damper or force-applier per se comprises a hydraulic cylinder 16 the piston-rod of which is suitably connected to horn 13 for effecting damping of the rudder.

The hydraulic cylinder is actuated by an electrically controlled hydraulic valve 18. Valve 18, in turn, is controlled by signals issuing from a rate-of-yaw gyro 19, these gyro-signals being sent to and utilized, as later described, by an amplifier 20 which forms part of the autopilot unit 21.

A rudder-position feedback link or lever 22 is connected at one end to the piston in order that its movement may correspond to the movement of the piston in cylinder 16. The opposite end of lever 22 is directly connected to a suitable electro-mechanical means 23 of the well-known "feedback" type so as to cause the movements of the piston to generate signals in instrument 23 which are fed to the amplifier 20 in such a way as to improve system-responses. This they do by eliminating the hunting and overcontrolling of the rudder otherwise effected by the rate-of-yaw gyro, which of course tends to feed yaw damping signals through the amplifier to the valve 18. Oscillating signals, or excessive signals from the gyro, are neutralized by the signals from the counter-signal generating means 23.

Means are provided in the control linkage that are arranged and constructed to either override or exist concurrently with the signal from amplifier 20 to valve 18 when the pilot physically applies a force opposing that being called out at the time by the gyro 19, the yaw damper remaining responsive to yawings. These means preferably take the form of force links, and in the embodiment shown, but one link 24 is employed. It is operatively interposed in the length of one of the rudder control links 14, and essentially comprises an elongate metallic piece having an ear at one end and horizontally bifurcated at the opposite end, both ends being bored for union to the linkage. Substantially in the center of the length of this link is an aperture 25 extending in the thicknesswise direction through the force-link. Mounted in this aperture is an "amplifier-overriding" group 27, provided and connected to superpose a signal upon the autopilot's electrical signals to the remainder of this yaw-damping system when the pilot desires to take over direct physical control of the rudder, or, when the autopilot or yaw-damping system fails. It also acts to superpose upon the signal from the rate-of-yaw gyro to the amplifier when the pilot applies control forces to the rudder system. A saw cut, or other line-of-weakness, 28, is provided in one wall of the aperture 25 and an expansion spring, or other biasing means, 29 is so mounted in 25 as to tend to spread open the saw cut 28. This it does when the pilot applies a tensile force opposing the oppositely directed tensile action on the rudder control-linkage by the yaw-damping system, as when the pilot operates his left rudder pedal. When he operates the right rudder pedal, with the hydraulic damper pushing forwardly, instead of the foregoing opposed tensile forces tending to widen the saw cut, two opposed compressive forces will be established tending to close the saw cut.

When the aforesaid opposed tensile forces are applied, the force-link in effect elongates and this elongation of the link changes the position of a plunger 30 coaxially mounted in an inductance coil 32 which is fastened in aperture 25. Coil 32 is fed by the autopilot and feeds amplifier 20. This plunger movement effects a corresponding change in the inductance field and hence in the current output of the inductance and this change superposes a signal upon the circuit to the amplifier from the autopilot or from the amplifier and rate gyro to the electrically operated valve 18. Although but one force-link has been shown, it is to be understood that a link 24 may, if desired, be incorporated in each length 14, the two links being electrically connected in such a manner, by well known means, not shown, that the differential of current between the two links is sent to the amplifier. This variant is depicted in Figure 3, in which the configuration is basically the same as that of Figure 1 but includes a "force-link" 24 in each of the push-pull rod linkages 14. The attitude of the force-link in one of the rods 14, however, is reversed, end-for-end, from that of the force-link in the other rod 14. Both force-links 24 are constructed identically and both are electrically connected to the amplifier of the auto-pilot group, as shown. Thus, when two opposed tensile forces are being applied by the pilot and the hydraulic damper to one link 24, the other link 24 is concurrently receiving two opposed compressive forces. The net effect on the system is the same as hereinabove mentioned, since the increase of inductance current emitted by one 24 to the amplifier is opposed by a diminished such current from the other 24, but the overall sensitivity is greatly enhanced. When only the rate-of-yaw gyro is sending signals to the amplifier this change overrides its signal and prevents the yaw damping system from opposing the pilot's efforts.

It is to be noted that the autopilot can function merely to "spell" the pilot when desired. When it is cut in, the yaw-damping system functions the same as before, since the rate-of-yaw gyro then merely imposes its signal upon the autopilot's, and the summation then acts to damp yawing and control the rudder.

It will be apparent to those skilled in the art that various changes and modifications may be made in the construction disclosed without departing from the spirit of the invention and it is intended that all such changes and modifications shall be embraced within the scope of the following claims.

We claim:

1. In an aircraft: a control surface; control-surface operating means; a source of electric signals; a servo-actuator for independently operating said surface to take care of yawing; means connected to said actuator for supplying pressure fluid thereto to power same; control means for said actuator interposed intermediate said supply means and the actuator and operatively connected to both the latter; a rate-of-yaw gyro operatively connected to said source of signals to impose its signals thereon; electrical conductor means connecting said signal-source and the actuator control means; and variable-length linear-force responsive means interposed bodily in the control-surface operating means to vary in length in response to opposed tensile forces and opposed compressive forces applied thereto by predetermined pilot-operations thereof for overriding the signals emanating from said signal source to said actuator-control so as to superpose the pilot's efforts upon the actuator without thereby disassociating the yaw-damping action from the control surface.

2. In an aircraft: a control surface; control-surface operating means; a source of electric signals; a servo-actuator for independently operating said surface to take care of yawing; means connected to said actuator for supplying pressure fluid thereto to power same; control means for said actuator interposed intermediate said supply means and the actuator and operatively connected to both the latter; a rate-of-yaw gyro operatively connected to said source of signals to impose its signals on said actuator control-means; electrical conductor means connecting said signal-source and the actuator control-means; and source-signals altering means operatively interposed in the length of the control-surface control-means, said signal-altering means including an inductance-field means electrically connected to said signal-source and responsive to the opposed tensile forces and opposed compressive forces generated in said control-surface control means by the servo-actuator and the pilot's actuation of said control means for superposing a signal upon the signals emanating from said signal source to said actuator-control so as to impose the pilot's efforts upon the actuator without thereby disassociating the yaw-damping system from the control surface.

3. In an aircraft: a control surface; control means for operating said surface; a signal emitting means; an amplifier connected to the signal emitting means for receiving the signals emitted by said signal emitting means; a discrete actuator for independently operating said surface; means for powering said actuator operatively connected to same; control means for said actuator interposed intermediate said powering means and the actuator and operatively connected to both the latter; a rate of aircraft oscillation gyro operatively connected to said amplifier; electrical conductor means connecting said amplifier and the actuator control-means; and variable-length linear force-responsive means bodily interposed in the control-surface operating means and constructed and organized with respect to said control-surface operating means so as to vary in effective length under opposed tensile forces and opposed compressive forces in said operating means and thereby superposing a signal upon the signals emanating from said amplifier to said actuator-control so as to impose the pilot's efforts upon the actuator without thereby disassociating the yaw-damping system from the control-surface.

4. In an aircraft susceptible to yaw: a rudder operable to damp the yaw; pilot-operable control-means arranged for operating said rudder; a signal emitting means; an amplifier connected to the signal emitting means for receiving the signals emitted by said signal emitting means; a discrete actuator for operating said rudder; means for powering said actuator connected to same; control means for said actuator disposed intermediate the source of power and the actuator; a rate-of-yaw gyro electrically connected to said amplifier; electrical connection means connecting said amplifier and said control means for said actuator; and electrical signal-altering means operatively interposed in the pilot-operable control means and electrically interposed between the amplifier and the gyro and signal emitting means, said altering means including an inductance field electrically connected to said amplifier and adapted to be so varied in effective length by opposed tensile forces and opposed compressive forces generated in said operating means by the discrete actuator and by the actuation of said pilot-operable control means as to overridingly but concurrently actuate control means for said actuator, thereby to enable pilot operation of the rudder without disassociating the yaw damping system from said control surface.

5. In an aircraft: a control surface; control-surface operating means; a source of electric signals; a servo-actuator for independently operating said surface to take care of yawing; means connected to said actuator for supplying pressure fluid thereto to power same; control means for said actuator interposed intermediate said supply means and the actuator and operatively connected to both the latter; a rate-of-yaw gyro operatively connected to said source of signals to impose its signals thereon; electrical conductor means connecting said signal-source and the actuator control-means; and source-signals altering means operatively interposed in the pilot-operable control means, said signals altering means including a spring-loaded axially movable member adapted to be moved by pilot operation of the surface and an inductance member arranged to be traversed axially by said displaceable member; said inductance member being electrically connected to said amplifier so as to effect superimposed operation of the actuator control means in response to pilot operation of the control system, thereby to enable the aircraft-oscillation damping system to automotically continue to operate with the surface controls also operable by the pilot.

6. In an aircraft: a control surface; control-surface operating means; a source of electric signals; a servo-actuator for independently operating said surface to take care of yawing; means connected to said actuator for supplying pressure fluid thereto to power same; control means for said actuator interposed intermediate said supply means and the actuator and operatively connected to both the latter; a rate-of-yaw gyro operatively connected to said source of signals to impose its signals thereon; electrical conductor means connecting said signal-source and the actuator control-means; means for establishing an inductance field; means electrically connecting said field to said amplifier; and means operatively interposed in the pilot-operable control surface control means and arranged to be tensilely lengthened and compressively shortened by movement of the latter and by conjoint opposed movement of the servo actuator for varying said inductance field to impress an additional signal upon said amplifier such as to render said actuator's control means responsive to pilot-efforts and to yawing.

7. In an aircraft: a control surface; control-surface operating means; a source of electric signals; a servo-actuator for independently operating said surface to take care of yawing; means connected to said actuator for supplying pressure fluid thereto to power same; control means for said actuator interposed intermediate said supply means and the actuator and operatively connected to both the latter; a rate-of-yaw gyro operatively connected to said source of signals to impose its signals thereon; electrical conductor means connecting said signal-source and the actuator control-means; a spring-biased force link operatively interposed in the pilot-operable control surface control means, said link being operatively connected to the energizing circuit of said actuator so as to also actuate same upon a force being applied to said force link thereby to enable the oscillation-damping system to operate even while the control surface control system remains manually operable by the pilot.

8. In an aircraft: a control surface; control-surface operating means; a source of electric signals; a servo-actuator for independently operating said surface to take care of yawing; means connected to said actuator for supplying pressure fluid thereto to power same; control means for said actuator interposed intermediate said supply means and the actuator and operatively connected to both the latter; a rate-of-yaw gyro operatively connected to said source of signals to impose its signals thereon; electrical conductor means connecting said signal-source and the actuator control means; a bodily dispaceable armature operatively interposed in the pilot-operable control surface control means and adapted thus to be displaced by movement of the latter means; a pick-up transformer operatively associated with said armature to inductively pick up movements thereof; and an electrical connection of said transformer to said signal-source such as to impress a concurrent signal upon the signal-source sufficient to operate said actuator according to the pilot's efforts and concurrently permitting the actuator to respond to yawings.

References Cited in the file of this patent

UNITED STATES PATENTS

| | | |
|---|---|---|
| 2,234,326 | Tiebel | Mar. 11, 1941 |
| 2,396,951 | Horstmann | Mar. 19, 1946 |
| 2,451,263 | Webb | Oct. 12, 1948 |
| 2,452,599 | Paulus et al. | Nov. 2, 1948 |
| 2,619,623 | Meredith | Nov. 25, 1952 |
| 2,662,207 | Hollister | Dec. 8, 1953 |
| 2,678,177 | Chenery et al. | May 11, 1954 |
| 2,686,285 | Meredith et al. | Aug. 10, 1954 |